March 27, 1928.

F. LEOPOLD ET AL 1,664,302

LICENSE PLATE HOLDER

Filed March 7, 1927

INVENTOR

Patented Mar. 27, 1928.

1,664,302

UNITED STATES PATENT OFFICE.

FRED LEOPOLD, SAMUEL E. CLANEY, AND LEWIS K. GARIS, OF PITTSBURGH, PENNSYLVANIA.

LICENSE-PLATE HOLDER.

Application filed March 7, 1927. Serial No. 173,303.

This invention relates to license plate holders and more particularly to holders of the type wherein the face of a license plate is covered with a sheet of transparent material to protect it from the weather and from mud and other matter which might be splashed thereon. In devices of this nature the plate and the holder are secured to the vehicle in such a manner that the face of the plate is visible through the transparent material.

License plate holders as heretofore constructed have been attended by numerous disadvantages. Such holders have commonly been constructed in part of metal, such metal being subject to rust and consequent structural weakening as well as unsightly appearance. Also, in holders of the type wherein a transparent shield is provided for covering the face of the plate, dust and mud frequently sift into the holder between the plate and the shield. This tends to obscure the face of the plate and to detract from the appearance thereof.

We provide a license plate holder comprising a transparent body having a plate holding recess in one face thereof, and means for holding the plate in the recess. A suitable gasket is provided, adapted to be positioned between the plate and the holder so as to form a tight joint and prevent ingress of dust or water. We further provide a plate holder having a cavity in one end of the transparent portion thereof, and illuminating means in the cavity for lighting the face of the plate. The light is diffused through the glass and gives to the plate a glowing appearance.

We have illustrated a present preferred embodiment of our invention in the accompanying drawings, forming a part of this specification, in which Figure 1 is a plan view of a license plate and holder assembled;

Figure 1:
Figure 2:
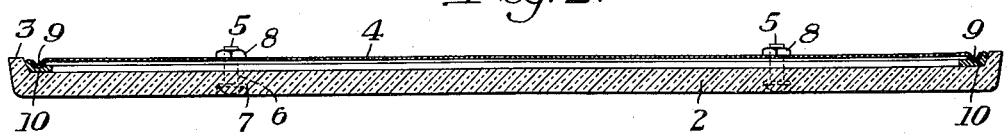
Figure 2 is a cross-sectional view taken along the line II—II of Figure 1.
Figure 3:
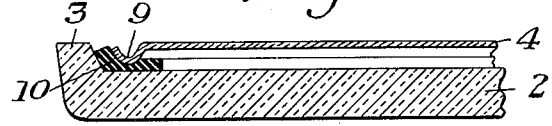
Figure 3 is a view to enlarged scale of a portion of Figure 2.

Referring first to Figures 1 to 3, there is shown a transparent cover or body pressed from glass and designated generally by the reference numeral 2. This cover is formed with a surrounding flange 3 forming a plate holding recess therein. The license plate 4 is maintained in position in the recess by bolts 5 passing through holes 6 in the cover and through correspondingly positioned holes in the plate. Such holes are formed in accordance with standard license plate specifications which are uniform throughout the United States and Canada. The holes 6 are enlarged to receive the heads of the bolts, and a resilient washer 7 is provided for cushioning each of the bolt heads from the body of the holder. Nuts 8 cooperate with the bolts to firmly secure the plate against the holder. In use, two of the bolts will be extended to engage the license plate bracket of the vehicle.

License plates are commonly formed with a bead 9 on the face adjacent the periphery thereof, and in order to insure a tight joint between the plate and the body, we provide a gasket 10 of any suitable material such as rubber adapted to be interposed between the bead on the plate and the body of the holder. When the plate is pressed firmly against the gasket, the bead 9 will deform the latter against the body and flange of the holder, thus preventing the ingress of dust or water between the holder and the plate and also preventing rattling of the two together.

Figure 4:
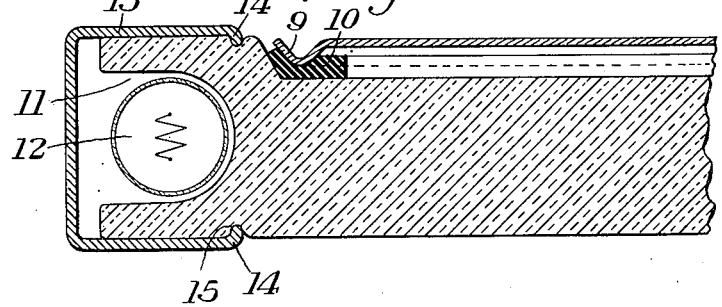
Figure 4 is a cross-sectional view showing a license plate holder with plate illuminating means embodied therein.

In the modification of Figure 4, the glass body portion of the holder is provided with a cavity 11 adjacent one end thereof for the reception of suitable illuminating means such as an electric light bulb 12. The bulb may be secured to the holder in any suitable manner. The light from the bulb is diffused through the glass and illuminates the face of the plate. By this provision the plate will appear to be illuminated from a hidden source of light, which will give it a glowing appearance. A suitable shield 13 surrounds the cavity in the end of the body, being attached to the body by means of flanges 14 adapted to be inserted into suitable depressions 15.

While we have shown and described a present preferred embodiment of our invention, it is to be understood that the same is not limited to the form shown but may be otherwise embodied within the scope of the following claims.

We claim:

1. A license plate holder, comprising a transparent body, means associated therewith for holding a plate so that its front face may be viewed through the body, and illuminating means for the plate within the body, such illuminating means being disposed forward of the plane of the front face of the plate.

2. A license plate holder, comprising a transparent body, means associated therewith for holding a plate behind the body, the body having a recess therein, the recess being so positioned as not to interfere with viewing substantially the entire face of the plate, and illuminating means in the recess.

3. A license plate holder, comprising a transparent body having a plate holding recess in one face thereof, means for holding a plate therein, a recess in one end of the body, and illuminating means in the recess, such illuminating means being disposed forward of the plane of the front face of the plate.

4. The combination with a license plate of a holder comprising a transparent body having a plate receiving recess therein, a gasket for spacing the plate from the body when contained in the recess, and means pressing the plate against the gasket and toward the body acting on the plate intermediate its edges to maintain the plate sprung toward the body whereby all possibility of rattling of the plate against the body is eliminated.

5. The combination with a license plate of a transparent holder, the plate being positioned so as to be viewed through the holder, and means for maintaining the plate sprung behind the holder so as to place it under tension and thereby prevent rattling of the plate against the holder.

In testimony whereof we have hereunto set our hands.

FRED LEOPOLD.
SAMUEL E. CLANEY.
LEWIS K. GARIS.